United States Patent
Takeuchi et al.

(10) Patent No.: US 6,971,888 B2
(45) Date of Patent: Dec. 6, 2005

(54) WATERPROOF STRUCTURE OF ELECTRIC JUNCTION BOX

(75) Inventors: Kunihiko Takeuchi, Ogasa-gun (JP); Masahiro Takamatsu, Toyota (JP); Nobuhiro Takada, Toyota (JP); Koji Nomura, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/809,855

(22) Filed: Mar. 26, 2004

(65) Prior Publication Data

US 2004/0188122 A1    Sep. 30, 2004

(30) Foreign Application Priority Data

Mar. 28, 2003  (JP)  .......................... P2003-090310

(51) Int. Cl.⁷ .......................... H01R 12/00; H05K 1/00
(52) U.S. Cl. ...................................... 439/76.2; 439/949
(58) Field of Search .............................. 439/76.2, 949; 174/65 G

(56) References Cited

U.S. PATENT DOCUMENTS 6,224,397 B1 *  5/2001  Nakamura ................. 439/76.2
6,679,708 B1 *  1/2004  Depp et al. ................ 439/76.2

FOREIGN PATENT DOCUMENTS

JP            1-76123 U        5/1989

* cited by examiner

Primary Examiner—Hae Moon Hyeon
(74) Attorney, Agent, or Firm—Sughrue Mion, PLLC

(57) ABSTRACT

A first cover body has a first space defined by peripheral walls. Each of a plurality of protruded portions has a through hole, and is outwardly protruded from at least one of the peripheral walls so as to define a groove communicated with the first space and the through hole. Each of a plurality of retainers is provided with one of the protruded portions. A second cover body is fitted with the first cover body so as to close the first space, while being retained by the retainers. A plurality of projections are provided on an outer periphery of a third cover body. The third cover body is disposed in the first space such that each of the projections is fitted into the groove so as to partition the first space from the through hole.

3 Claims, 5 Drawing Sheets

WATERPROOF STRUCTURE OF ELECTRIC JUNCTION BOX

BACKGROUND OF THE INVENTION

This invention relates to a waterproof structure of an electric junction box in which: a circuit board assembly, disposed within a main cover, is covered by an intermediate cover; and a part such as an electronic control unit is mounted on an outer side of the intermediate cover, and is covered with a sub cover.

FIG. 4 shows one form of waterproof structure of a conventional electric junction box disclosed in Japanese Utility Model Publication No. 1-76123U (cf., pages 1–2 and FIG. 2).

This electric junction box 41 includes a first cover 42 and a second cover 43 both of which are made of a synthetic resin, and a circuit board assembly 44 is disposed in a space formed by the two covers 42, 43, and therefore the circuit board assembly 44 is protected from external waterdrops 45, dust and others by the covers 42, 43.

The first cover 42 has retaining projections 47 outwardly extended from a peripheral wall 46 thereof, and the second cover 43 has engagement holes 49 formed through an intermediate portion of a peripheral wall 48 thereof. The retaining projections 47 are engaged in the engagement holes 49, respectively. The number of the retaining projections 47 as well as the number of the engagement holes 49 is suitably determined.

The peripheral wall 48 of the second cover 43 projects (as at 50) like an eave beyond the peripheral wall 46 of the first cover 42, and arch-shaped protruded portions 51 are formed integrally on the outer face of the peripheral wall 48. Each retaining projection 47 and the associated engagement hole 49 are disposed inside the corresponding protruded portion 51, and are protected from the external waterdrops and others. The external waterdrops 45 drop onto the protruded portion 51, and flow along the surface of the protruded portion 51, and drop to the exterior from the eave portion 50, and therefore the waterdrops 45 are prevented from intruding into the interior of the covers 42, 43 through the engagement hole 49.

In the above structure, however, when waterdrops are blown to an opening 52 of the protruded portion 51 or when the electric junction box 41 is used, with its mounting direction turned 90 degrees, there is encountered a problem that waterdrops, introduced into the protruded portion 51, intruded into the interior of the covers 42, 43 through the engagement hole 49, and adversely affected the circuit board assembly 44, an electronic part, etc., therein.

Besides, in the case where a retaining projection for a third cover (not shown) for an external electronic control unit or the like is provided within each protruded portion 51, an opening must be formed in a bottom portion 53 of the protruded portion 51 so as to enable the removal of a mold used in a resin-molding operation. Therefore, waterdrops are more liable to intrude into the protruded portion through the two (right and left) openings, and this encounters a problem that the waterproof performance of the electric junction box is adversely affected.

SUMMARY OF THE INVENTION

It is therefore an object of the invention to provide a waterproof structure of an electric junction box in which protruded portions for retaining a cover are formed at a box body, and waterdrops and others are prevented from intruding into the interior of the cover (box body) through the protruded portions, thereby enhancing a waterproof performance.

In order to achieve the above object, according to the invention, there is provided an electric junction box, comprising:

a first cover body, having a first space defined by peripheral walls;

a plurality of protruded portions, each having a through hole, and outwardly protruded from at least one of the peripheral walls so as to define a groove communicated with the first space and the through hole;

a plurality of retainers, each provided with one of the protruded portions;

a second cover body, fitted with the first cover body so as to close the first space, while being retained by the retainers; and a third cover body, comprising a plurality of projections provided on an outer periphery thereof, the third cover body being disposed in the first space such that each of the projections is fitted into the groove so as to partition the first space from the through hole.

In such a configuration, the intrusion of waterdrops along the protruded portion of the first cover body is prevented by the projections of the third cover body. Accordingly, adverse effects, such as short-circuiting and rusting, will not be exercised on electric components disposed within the electric junction box, so that the reliability of the electrical connection of the electric junction box is enhanced over a long time period.

Further, since the projections of the third cover body also serve as positioning members with respect to the first cover body, the installing operation of the third cover body can be easily and smoothly performed.

Preferably, each of the retainer is a retaining projection formed in the groove so as to extend toward the first space.

In such a configuration, when the third cover body is installed in the first cover body, each of the projections of the third cover body pushes the retaining projection outwards, so that the protruded portions are accordingly flexed outwards. Therefore, the installing operation of the third cover body is facilitated. When the second cover body is fitted with the first cover body, or when the second and third cover bodies are removed from the first cover body, the same advantages can be attained.

Preferably, the electric junction box further comprises: a first electric equipment, disposed between the first cover body and the third cover body; and a second electric equipment, disposed between the second cover body and the third cover body.

In such a configuration, the first electric equipment is protected from foreign matters by the third cover body and the projections thereof. Further, the first electric equipment is doubly protected by the second and third cover bodies. The second electric equipment is protected by the second cover body.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE INVENTION

One preferred embodiment of the present invention will now be described in detail with reference to the accompanying drawings.

Figure 2:
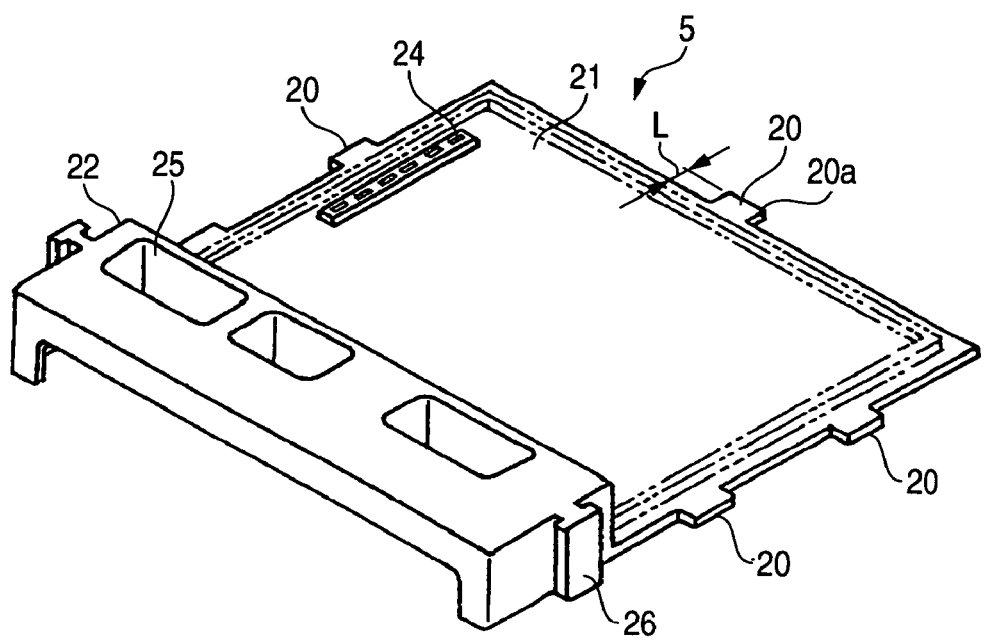
FIG. 2 is a perspective view showing an intermediate cover to be mounted in the main body of FIG. 1.
Figure 3A:
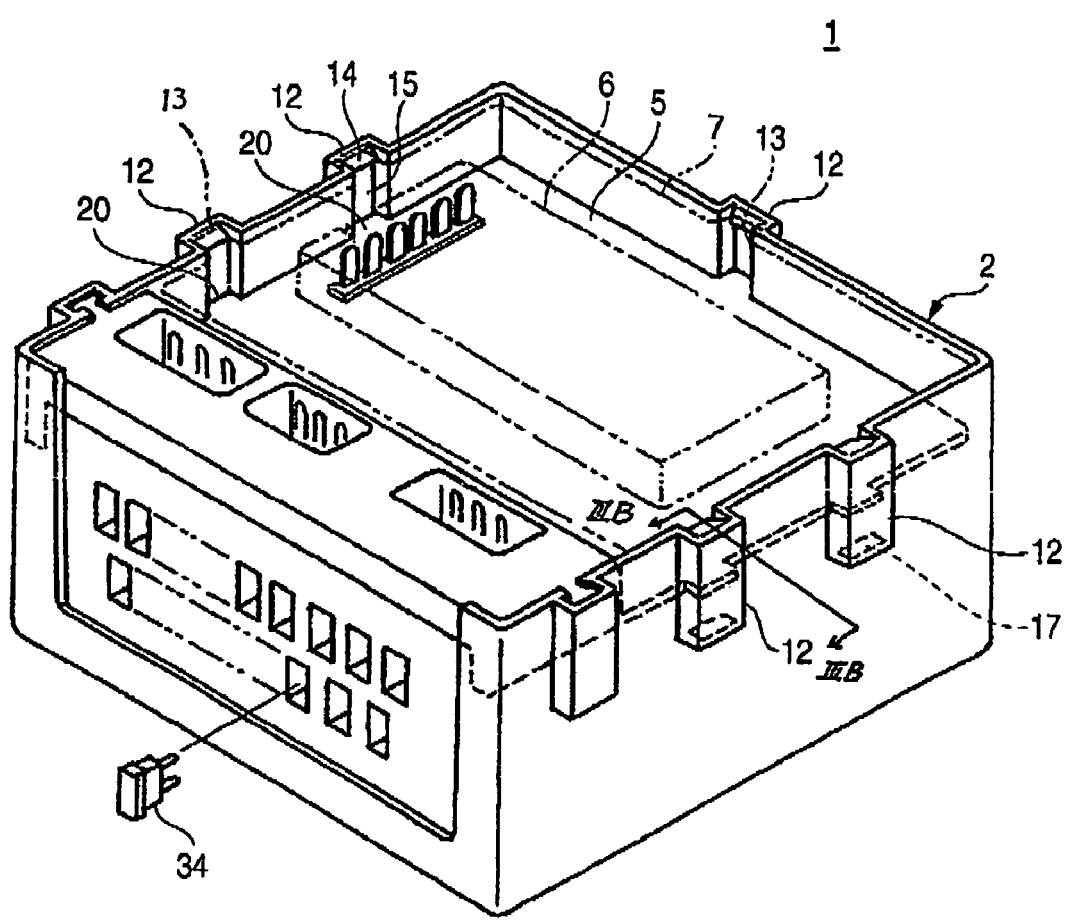
FIG. 3A is a perspective view showing a waterproof structure of the electric junction box.

In this embodiment, an electric junction box 1 comprises: a main cover 2 (box body) molded with synthetic resin; a circuit board assembly 3 and a fuse block 4 which are disposed within the main cover 2; an intermediate cover 5 molded with synthetic resin (see FIGS. 2 and 3A) provided on a sub-assembly formed by the circuit board assembly 3 and the fuse block 4; an electronic control unit 6 (shown in dashed lines in FIG. 3A) mounted on the intermediate cover 5; and a sub cover 7 (shown in dashed lines in FIG. 3A) covering the electronic control unit 6.

Figure 1:
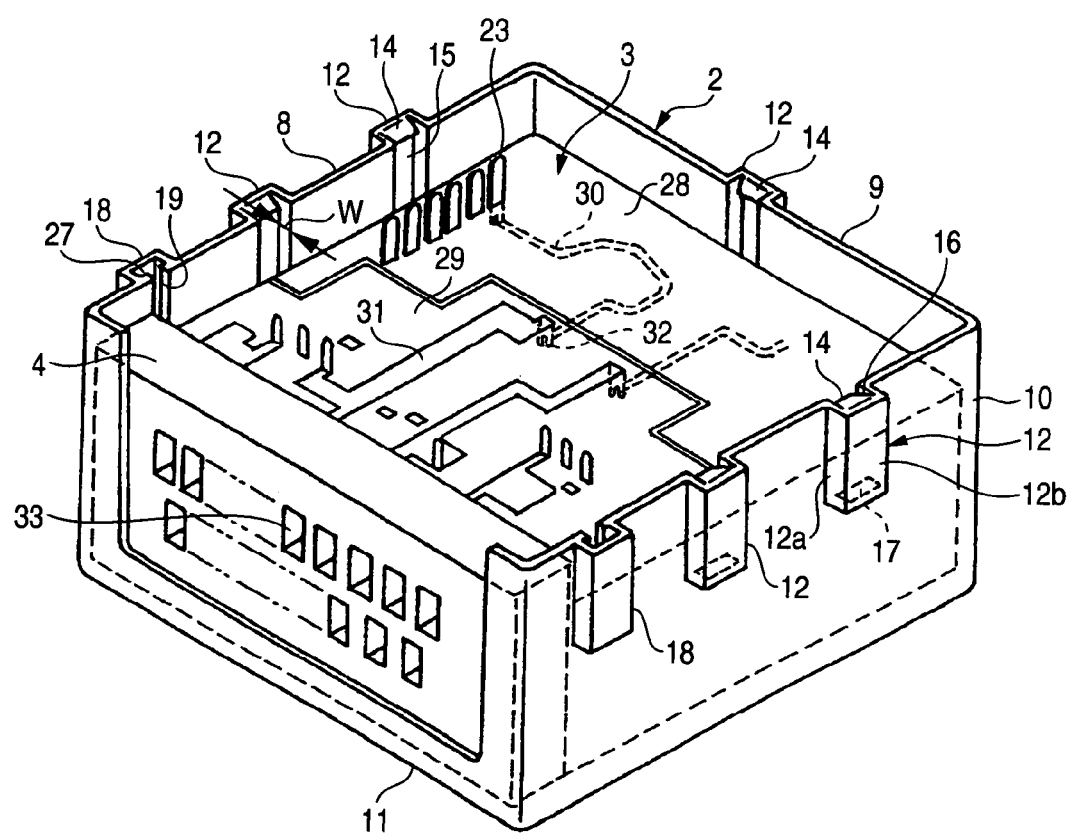
FIG. 1 is a perspective view showing a main body of an electrical junction box according to one embodiment of the invention.

As shown in FIG. 1, the main cover 2 includes a peripheral wall defined by three side walls (left, right and rear walls) 8 to 10, and a base wall 11 perpendicularly connected to lower edges of the side walls 8 to 10. Protruded portions 12 having a rectangular transverse cross-section are formed on each of the three side walls 8 to 10, and a retaining projection 14 is formed integrally within each of the protruded portions 12, which is to be engaged with an associated engagement projection 13 of the sub cover 7 (described later) or the like.

Each of the protruded portions 12 is defined by a pair of short-side wall portions 12a extending perpendicularly from the side wall (8 to 10), and a long-side wall portion 12b of a larger width interconnecting the short-side wall portions 12a. The protruded portion 12 defines an internal space 15 having a rectangular transverse cross-section extending therethrough in an upward-downward direction, thereby forming upper and lower openings 16, 17.

Figure 3B:
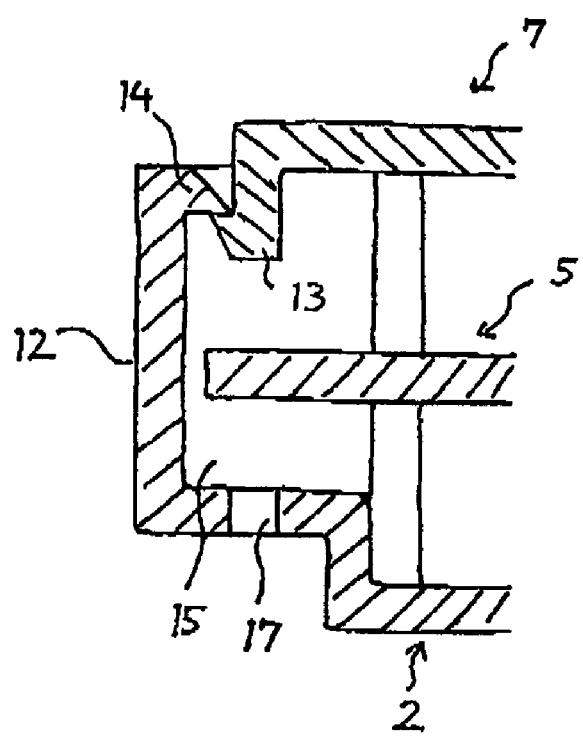
FIG. 3B is a side view showing a protruded portion of the electric junction box.
Figure 4:
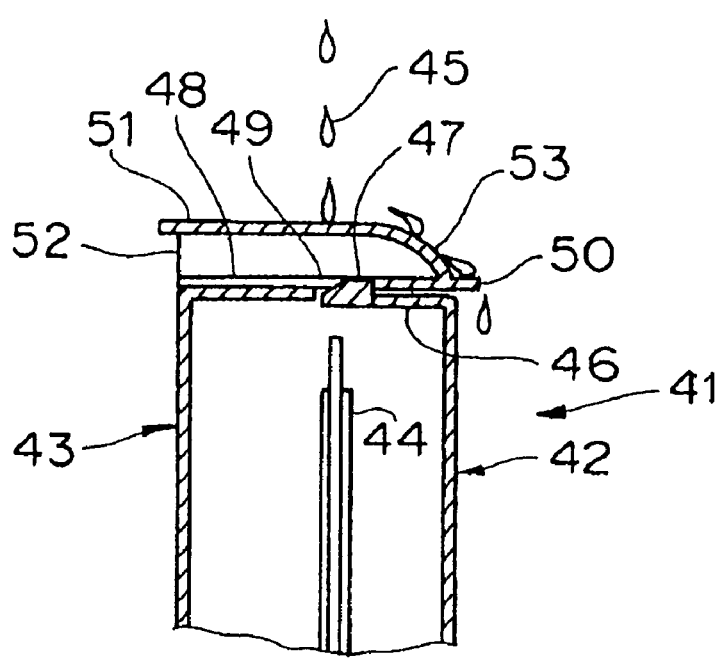
FIG. 4 is a vertical cross-sectional view showing a waterproof structure of a related-art electric junction box.

The retaining projection 14 is formed at the upper opening 16. More specifically, the retaining projection 14 is formed on an inner surface of the wide wall portion 12b of the protruded portion 12, and projects inwardly therefrom toward the inside of the main cover 2, and opposite side edges of the retaining projection 14 are perpendicularly continuous to the short-side wall portions 12a of the protruded portion 12, respectively. Since the retaining projections 14 are directed inwardly, the attaching or detaching operation of the intermediate cover 5 and the sub cover 7 with respect to the main cover 2 can be easily performed through outward elastic deformation of the protruded portions 12 (see FIG. 3B).

In addition to the protruded portions 12, a pair of left and right protruded portions 18 for sliding the intermediate cover 5 are formed respectively on those portions of the left and right walls 8, 10 disposed near to the front end of the main cover 2. Each of the protruded portions 18 is formed with a groove 19 having a T-shaped transverse cross section and extending in parallel with the side wall 8, 10. The length of the protruded portions 12, 18, the position of the retaining projections 14, etc., are suitably determined in accordance with the size, shape, etc., of the electronic control unit 6.

The present invention is mainly aimed at enhancing the waterproof performance of the protruded portions 12 for retaining the sub-cover 7. In FIG. 1, the direction (the upper, lower, front, rear, left and right sides) of the electric junction box 1 has no relation to the mounting direction of the electric junction. box 1, and there are occasions when the electric junction box is used in an upside-down condition or in a 90 degree-turned condition. In this specification, for the convenience, the constructions of the various portions are explained, using the direction (the upper, lower, right and left sides) shown in FIG. 1.

Each of the protruded portions 12 for retaining the sub cover 7 extends vertically from the upper end of the corresponding side wall (8 to 10) to an almost middle portion in the height direction thereof, and has the retaining projection 14 formed at the upper end thereof. This protruded portion 12 has an opening 17, from which a mold is retracted in the molding process, at its lower end. Therefore, there is an anxiety that waterdrops, dust and others intrude into the interior of the main cover 2 (that is, the interior of the electric junction box 1) through the spaces 15 disposed respectively beneath the retaining projections 14. Depending on the occasion, the retaining projection 14 may be omitted from at least one of the protruded portions 12.

In this embodiment, the projections 20 are formed at a peripheral edge of the intermediate cover 5. Each of the projections 20 is fitted into the space 15 of one of the budge portions 12 when the intermediate cover is mounted in the main case 2. As a result, the projections 20 partition the spaces 15 from the exterior, thereby preventing waterdrops or the like from intruding into the main body 2 through the openings 16, 17.

A projected length L (see FIG. 2) of each projection 20 does not always need to be equal to a recessed depth W of the space 15, and even when the length L of the projection 20 is smaller than the depth W of the space 15, the sufficient waterproof and moisture-proof effect is achieved. A gap may be formed between a distal end 20a of the projection 20 and a bottom surface of the space 15 if the projection 20 substantially closes the internal space 15. The length L of the projection 20 need to be at least long enough to overlap the retaining projection 14 (that is, the projection 20 underlies the retaining projection 14).

The intermediate cover 5 includes: a horizontal plate portion 21 for covering a large proportion of the circuit board assembly 3 disposed in the 20 main cover 2; and a block portion 22 which extends from the plate portion 21 so as to cover a front end portion of the circuit board assembly 3 and the fuse block 4. The above described projections 20 are formed integrally at opposite (left and right) side edges and rear edge of the plate portion 21.

Specifically, two projections 20 are formed at each of the left and right side edges of the plate portion 21, and one projection 20 is formed at the rear edge thereof. The positions and number of the projections 20 are suitably determined in accordance with the positions, number or the like of the protruded portions 12 of the main cover 2 (that is, with the positions, number or the like of the retaining portions 14 of the sub cover 7 for the electronic control unit (ECU) 6. As shown in FIG. 1, holes 24 are formed through the plate portion 21, so that pin-shaped terminals 23 projecting from the circuit board assembly 3 respectively pass through these holes 24 to be connected to the electronic control unit 6.

The block portion 22 projects upwardly to a level higher than the plate portion 21, and has a female connector housing 25 formed integrally therewith.

The block portion 22 is formed with, at both side faces, a pair of projections 26 each having a T-shaped transverse cross section corresponding to the shape of the groove 19 of the protruded portion 18. When the intermediate cover 5 is mounted in the main cover 2, the projections 26 are slidingly fitted into the grooves 19, thereby preventing waterdrops or the like from-intruding into the main cover 2 through the budge portions 18. Such a configuration facilitates the mounting operation of the intermediate cover 5.

As shown in FIG. 1, the circuit board assembly 3 comprises a wiring circuit board 28 and a bus bar circuit board 29. Wires 30, installed on the wiring circuit board 28, are connected to uprighted press-contacting terminals 32 of bus bars 31 provided on the bus bar circuit board 29. A fork-shaped terminal (not shown) is projected horizontally from a front end of each bus bar 31, and is fitted into a fuse receiving chamber 33 of the fuse block 4 to be connected to a tab terminal of a fuse 34 (see FIG. 3A). A connector housing, a relay-mounting portion, or the like (not shown) are mounted integrally on the bottom wall 11 of the main cover 2. Terminals (not shown) of the circuit board assembly 3 are disposed in these connector housing and relay-mounting portion, and are connected to a connector and relays of an external wire harness.

The waterproof structure of the invention can be applied to any suitable form of electric junction box which comprises: a main cover; a circuit board assembly including one or a plurality of circuit boards and disposed within the main cover; an intermediate cover covering the circuit board assembly; electronic equipments such as an electronic control unit provided on the outside of the intermediate cover; and a sub cover covering the electronic equipments. In the case where one circuit board is used, this circuit board is connected to other electronic part or the like to form a circuit board assembly.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An electric junction box, comprising:
   a first cover body, having a first space defined by peripheral walls;
   a plurality of protruded portions, each having a through hole, and outwardly protruded from at least one of the peripheral walls so as to define a groove communicated with the first space and the through hole;
   a plurality of retainers, each provided with one of the protruded portions;
   a second cover body, fitted with the first cover body so as to close the first space, while being retained by the retainers; and
   a third cover body, comprising a plurality of projections provided on an outer periphery thereof, the third cover body being disposed in the first space so as to divide the first space into an upper region located between the third cover body and the second cover body and a lower region located below the third cover body, such that each of the projections is fitted into the groove so as to partition the upper region of the first space from-the through hole.

2. The electric junction box as set forth in claim 1, wherein each of the retainers is a retaining projection formed in the groove so as to extend toward the first space.

3. The electric junction box as set forth in claim 1, further comprising:
   a first electric equipment, disposed between the first cover body and the third cover body; and
   a second electric equipment, disposed between the second cover body and the third cover body.

* * * * *